United States Patent
Ikeda

(10) Patent No.: US 7,893,984 B2
(45) Date of Patent: Feb. 22, 2011

(54) IMAGE CAPTURING APPARATUS, METHOD OF CONTROLLING THE SAME, AND PROGRAM

(75) Inventor: Yasuyuki Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 365 days.

(21) Appl. No.: 12/186,912

(22) Filed: Aug. 6, 2008

(65) Prior Publication Data

US 2009/0066831 A1    Mar. 12, 2009

(30) Foreign Application Priority Data

Sep. 12, 2007  (JP)  ............................... 2007-237262

(51) Int. Cl.
*H04N 5/222* (2006.01)
*H04N 5/76* (2006.01)
*G01N 21/88* (2006.01)

(52) U.S. Cl. ............................. 348/333.12; 348/333.02; 348/247; 348/335; 348/231.99; 250/559.45

(58) Field of Classification Search .............. 348/222.1, 348/333.01, 333.02, 333.11, 231.99, 231.3, 348/246, 247, 335, 340, 333.12; 358/3.26, 358/1.14, 463, 474; 250/559.45, 559.46
See application file for complete search history.

(56) References Cited

U.S. PATENT DOCUMENTS 7,535,501 B1 * 5/2009 Loushin et al. ............. 348/246

2006/0115177 A1 * 6/2006 Ishiga ....................... 382/275
2007/0195185 A1 * 8/2007 Onuki ................... 348/333.02
2009/0153709 A1 * 6/2009 Kanzaki et al. ............. 348/294
2009/0303374 A1 * 12/2009 Ueda et al. ............. 348/333.08
2010/0066890 A1 * 3/2010 Ueda et al. ............. 348/333.02

FOREIGN PATENT DOCUMENTS

JP    2004-222231    8/2004

* cited by examiner

*Primary Examiner*—Lin Ye
*Assistant Examiner*—Marly Camargo
(74) *Attorney, Agent, or Firm*—Cowan, Liebowitz & Latman, P.C.

(57) ABSTRACT

An image capturing apparatus includes an image capturing unit which causes an image sensor to photoelectrically convert an object image to generate an image signal, a display unit which displays the image signal generated by the image capturing unit, a storage unit which stores foreign substance information that is information about at least the position and size of a foreign substance sticking to the surface of an optical element arranged in front of the image sensor, and a control unit which controls the display unit to display the image signal while superimposing, on it, an image which represents presence of the foreign substance and is generated based on the foreign substance information stored in the storage unit during a live view operation of sequentially displaying, on the display unit, image signals sequentially generated by the image capturing unit.

10 Claims, 11 Drawing Sheets

| PARAMETERS | SETTINGS |
|---|---|
| APERTURE VALUE | F22 |
| ISO | 400 |
| SHUTTER SPEED | 1/30 |
| PHOTOMETRY MODE | AVERAGE PHOTOMETRY |
| ELECTRONIC FLASH | INHIBITED |
| EXPOSURE COMPENSATION | INHIBITED |
| AF MODE | MANUAL |

FIG. 5

| ADDRESS OFFSET (Hex) | CODE (Hex) | MEANING |
|---|---|---|
| +00 | FF | Prefix |
| +01 | E0 | |
| +02 | | F-NUMBER (NUMERATOR) |
| +04 | | F-NUMBER (DENOMINATOR) |
| +06 | | LENS PUPIL POSITION (NUMERATOR) |
| +08 | | LENS PUPIL POSITION (DENOMINATOR) |
| +0A | | NUMBER OF DUST REGIONS |
| +0C | | PARAMETERS OF DUST REGION $D_1$<br>    RADIUS (2 BYTES)<br>       x-COORDINATE OF CENTER (2 BYTES)<br>       y-COORDINATE OF CENTER (2 BYTES) |
| | | PARAMETERS OF DUST REGION $D_2$ |
| | | . . . |
| | | PARAMETERS OF DUST REGION $D_n$ |

FOCUS MEASURING FRAME

DUST IS CONTAINED IN THIS REGION

HISTORY IS LEFT

REGIONS WHERE DUST PARTICLES REGISTERED IN DUST INFORMATION STICK (DUST PARTICLES ARE PRESENT IN CIRCLES)

IMAGE CAPTURING APPARATUS, METHOD OF CONTROLLING THE SAME, AND PROGRAM

BACKGROUND OF THE INVENTION

1. Field of the Invention

The present invention relates to a technique of notifying a user of degradation in image quality caused by a foreign substance sticking to the surface of, e.g., an optical low-pass filter arranged in front of an image sensor in an image capturing apparatus which uses an image sensor such as a CCD or CMOS sensor.

2. Description of the Related Art

When the lens is detached from the camera body of a lens-interchangeable digital camera, dust particles floating in air may enter the camera body. The camera incorporates various mechanical units such as a shutter mechanism which mechanically operate. When these mechanical units operate, dust such as metal powder may be generated in the camera body.

When a foreign substance such as dust sticks to the surface of an optical element (e.g., optical low-pass filter) arranged in front of an image sensor included in the image capturing unit of the digital camera, the image of the foreign substance is contained in a sensed image, resulting in degradation in the image quality.

A camera using a silver halide film feeds the film in every shooting. Hence, images never contain the same foreign substance at the same position continuously. However, the digital camera requires no operation of feeding the film frame in every shooting, and therefore, sensed images continuously contain the same foreign substance at the same position.

To solve this problem, Japanese Patent Laid-Open No. 2004-222231 discloses a method of correcting a luminance change caused by a foreign substance on the basis of a reference image. In Japanese Patent Laid-Open No. 2004-222231, an object having a uniform luminance is sensed to obtain a reference image, and a transmittance map is generated from the luminance distribution of the image. Appropriate gain correction is performed for an image sensed by a user to correct a change in transmittance caused by a foreign substance, thereby obtaining a high-quality image.

In the conventional method, however, the user cannot confirm the position and size of a dust particle before or during shooting. For this reason, the user cannot predict the degree of influence of the dust image on a sensed main object.

SUMMARY OF THE INVENTION

The present invention has been made in consideration of the above-described problem, and has as its object to easily notify, before shooting, a user of the degree of foreign substance sticking to, e.g., an optical filter arranged in front of an image sensor.

In order to solve the above-described problem and achieve the object, according to the first aspect of the present invention, there is provided an image capturing apparatus comprising an image capturing unit which causes an image sensor to photoelectrically convert an object image to generate an image signal, a display unit which displays the image signal generated by the image capturing unit, a storage unit which stores foreign substance information that is information about at least a position and size of a foreign substance sticking to a surface of an optical element arranged in front of the image sensor, and a control unit which controls the display unit to display the image signal while superimposing, on the image signal, an image which represents presence of the foreign substance and is generated based on the foreign substance information stored in the storage unit during a live view operation of sequentially displaying, on the display unit, image signals sequentially generated by the image capturing unit.

According to the present invention, there is also provided a method of controlling an image capturing apparatus including an image capturing unit which causes an image sensor to photoelectrically convert an object image to generate an image signal, and a display unit which displays the image signal generated by the image capturing unit, comprising the steps of storing, in a storage unit, foreign substance information that is information about at least a position and size of a foreign substance sticking to a surface of an optical element arranged in front of the image sensor, and controlling the display unit to display the image signal while superimposing, on the image signal, an image which represents presence of the foreign substance and is generated based on the foreign substance information stored in the storage unit during a live view operation of sequentially displaying, on the display unit, image signals sequentially generated by the image capturing unit.

Further features of the present invention will become apparent from the following description of exemplary embodiments with reference to the attached drawings.

BRIEF DESCRIPTION OF THE DRAWINGS

FIG. 5 is a view showing an example of the structure of dust information;

DESCRIPTION OF THE EMBODIMENTS

Preferred embodiments of the present invention will now be described in detail with reference to the accompanying drawings.

First Embodiment

Figure 1:
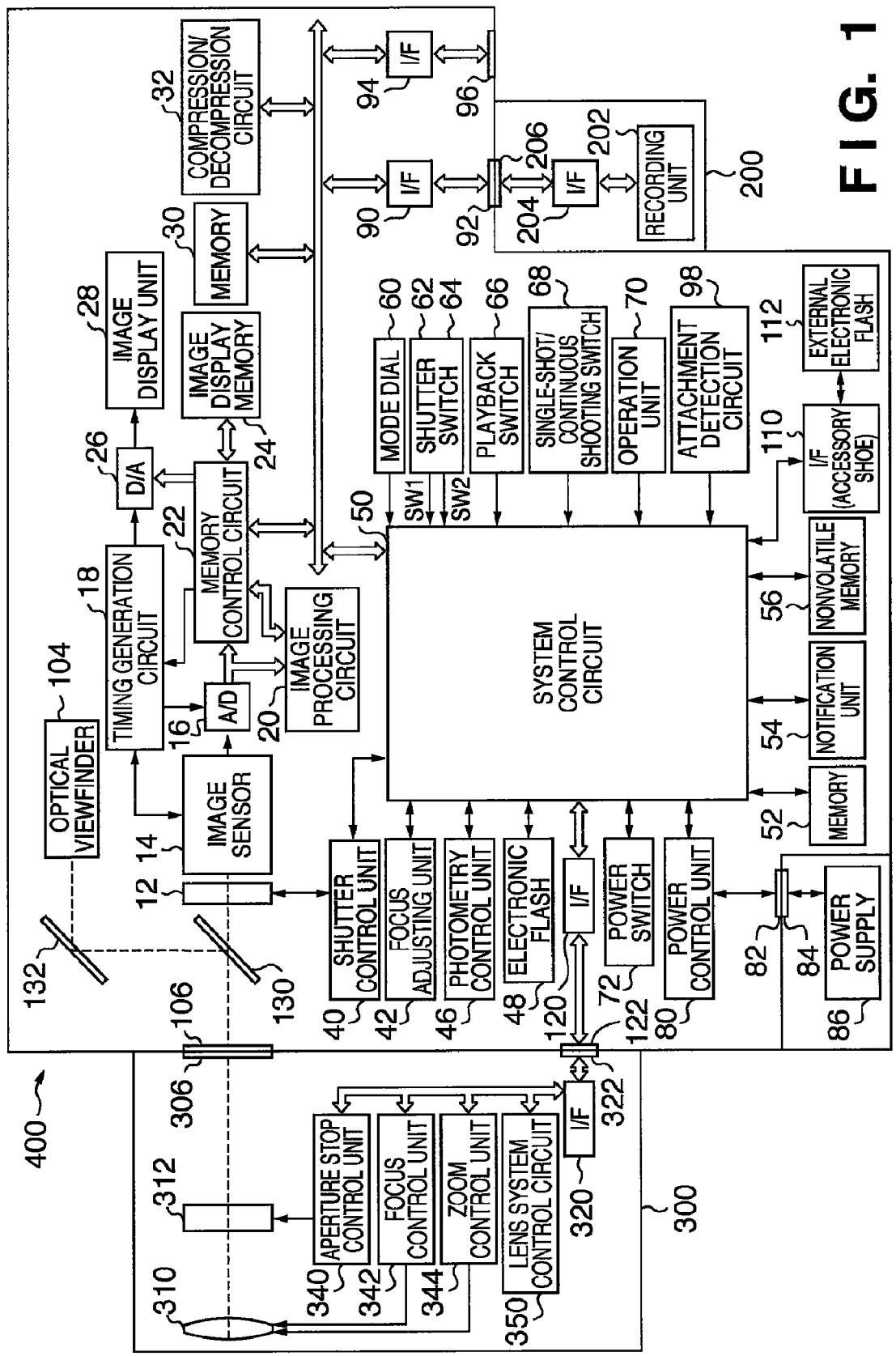
FIG. 1 is a block diagram showing the arrangement of an image capturing apparatus having an image processing function according to the first embodiment of the present invention.

FIG. 1 is a block diagram showing the arrangement of an image capturing apparatus having an image processing function according to the first embodiment of the present invention. In this embodiment, a lens-interchangeable single-lens reflex digital still camera will be exemplified as the image capturing apparatus. The present invention is applicable not only to the single-lens reflex digital still camera but also to, e.g., a lens-interchangeable digital video camera.

Referring to FIG. 1, a single-lens reflex digital still camera 400 mainly includes a camera body 100 and a lens unit 300 of interchangeable-lens type.

The lens unit 300 includes an imaging lens 310 formed from a plurality of lenses, an aperture stop 312, and a lens mount 306 which mechanically connects the lens unit 300 to the camera body 100. The lens mount 306 incorporates various mechanisms for electrically connecting the lens unit 300 to the camera body 100. An interface 320 connects the lens unit 300 to the camera body 100. A connector 322 electrically connects the lens unit 300 to the camera body 100.

The connector 322 also has a function of transmitting control signals, state signals, and data signals between the camera body 100 and the lens unit 300 and also supplying currents of various voltages to the lens unit 300. The connector 322 may have not only the telecommunication function but also an optical communication or speech communication function.

An aperture stop control unit 340 controls the aperture stop 312 in cooperation with a shutter control unit 40 (to be described later) which controls a shutter 12 of the camera body 100 based on photometry information from a photometry control unit 46. A focus control unit 342 controls focusing of the imaging lens 310. A zoom control unit 344 controls zooming of the imaging lens 310.

A lens system control circuit 350 controls the overall lens unit 300. The lens system control circuit 350 has a memory for storing constants, variables, and programs for operations. The lens system control circuit 350 also has a nonvolatile memory for holding identification information such as a number unique to the lens unit 300, management information, functional information such as the open and minimum aperture values and a focal length, and current and past set values.

The arrangement of the camera body 100 will be described next.

A lens mount 106 mechanically connects the camera body 100 to the lens unit 300. Mirrors 130 and 132 guide a light beam that has entered the imaging lens 310 to an optical viewfinder 104 by the single-lens reflex method. The mirror 130 can be either a quick return mirror or a half mirror. Reference numeral 12 denotes a focal plane shutter, and 14, an image sensor which photoelectrically converts an object image to generate an image signal. The light beam that has entered the imaging lens 310 is guided via the aperture stop 312 serving as a light amount restriction means, the lens mounts 306 and 106, the mirror 130, and the shutter 12 by the single-lens reflex method and forms an optical image on the image sensor 14.

An A/D converter 16 converts an analog signal output from the image sensor 14 into a digital signal. A timing generation circuit 18 supplies clock signals and control signals to the image sensor 14, A/D converter 16, and D/A converter 26. The timing generation circuit 18 is controlled by a memory control circuit 22 or a system control circuit 50.

An image processing circuit 20 executes predetermined pixel interpolation processing or color conversion processing for data from the A/D converter 16 or data from the memory control circuit 22. The image processing circuit 20 also performs predetermined arithmetic processing using image data output from the A/D converter 16, as needed. Based on the obtained arithmetic result, the system control circuit 50 executes auto-focus (AF) processing, auto-exposure (AE) processing, and pre-electronic flash (EF) processing of TTL (Through The Lens) scheme to control the shutter control unit 40 and a focus adjusting unit 42. The image processing unit 20 also executes predetermined arithmetic processing using image data output from the A/D converter 16 and also performs automatic white balance (AWB) processing by TTL scheme based on the obtained arithmetic result.

In the example shown in FIG. 1, the focus adjusting unit 42 and photometry control unit 46 for exclusive use are provided. Hence, AF processing, AE processing, and EF processing may be performed using not the image processing circuit 20 but the focus adjusting unit 42 and the photometry control unit 46. Alternatively, AF processing, AE processing, and EF processing may be performed first by using the focus adjusting unit 42 and the photometry control unit 46 and then by using the image processing circuit 20.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is written in the image display memory 24 or memory 30 via the image processing circuit 20 and memory control circuit 22 or via only the memory control circuit 22.

Display image data written in the image display memory 24 is displayed on an image display unit 28 such as an LCD of TTL scheme via the D/A converter 26. The image display unit 28 sequentially displays sensed (sequentially generated) image data, thereby implementing an electronic viewfinder (EVF) function. The electronic viewfinder function is also called a live view operation. The image display unit 28 can arbitrarily turn on/off its display in accordance with an instruction from the system control circuit 50. When display is OFF, the power consumption of the camera body 100 can greatly be reduced.

The memory 30 is used to store sensed still images and has a memory capacity enough to store a predetermined number of still images. Hence, even in continuous shooting or panoramic shooting for continuously sensing a plurality of still images, it is possible to write an enormous amount of image data in the memory 30 at a high speed. The memory 30 is also usable as the work area of the system control circuit 50.

The compression/decompression circuit 32 compresses/decompresses image data using a known compression method such as adaptive discrete cosine transform (ADCT). The compression/decompression circuit 32 reads out an image from the memory 30, compresses or decompresses it, and writes the processed data in the memory 30 again.

The shutter control unit 40 controls the shutter 12 in cooperation with the aperture stop control unit 340 that controls the aperture stop 312 based on photometry information from the photometry control unit 46. The focus adjusting unit 42 executes AF (auto-focus) processing. A light beam that has entered the imaging lens 310 of the lens unit 300 is guided via the aperture stop 312, lens mounts 306 and 106, mirror 130, and a focus adjusting sub-mirror (not shown) by the single-lens reflex method, thereby detecting the in-focus state of an image formed as an optical image.

The photometry control unit 46 executes AE (auto-exposure) processing. A light beam that has entered the imaging lens 310 of the lens unit 300 is guided via the aperture stop 312, lens mounts 306 and 106, mirror 130, and a photometry sub-mirror (not shown) by the single-lens reflex method, thereby detecting the exposure state of an image formed as an optical image. An electronic flash 48 has an AF auxiliary light projecting function and an electronic flash control function. The photometry control unit 46 also has an EF (electronic flash control) processing function in cooperation with the electronic flash 48.

AF control may be done using the measurement result of the focus adjusting unit 42 and the arithmetic result obtained by causing the image processing circuit 20 to arithmetically process image data from the A/D converter 16. Exposure control may be done using the measurement result of the photometry control unit 46 and the arithmetic result obtained by causing the image processing circuit 20 to arithmetically process image data from the A/D converter 16.

The system control circuit 50 controls the overall camera body 100 and incorporates a known CPU. A memory 52 stores constants, variables, and programs for the operation of the system control circuit 50.

A notification unit 54 notifies the outside of operation states and messages using a text, image, and sound in accordance with program execution by the system control circuit 50. As the notification unit 54, a display unit such as an LCD or LED for visual display and a sound generation element for generating a notification by sound are used. The notification unit 54 includes one of them or a combination of two or more of them. Especially, a display unit is arranged at a single visible position or a plurality of visible positions near an operation unit 70 of the camera body 100. Some functions of the notification unit 54 are arranged in the optical viewfinder 104.

The display contents of, e.g., the LCD of the notification unit 54 include display associated with shooting modes such as single shot/continuous shooting and self timer, display associated with recording such as a compression ratio, number of recording pixels, number of recorded images, number of recordable images, and display associated with shooting conditions such as a shutter speed, aperture value, exposure compensation, brightness compensation, external flash light emission amount, and red eye mitigation. The LCD also displays macro shooting, buzzer setting, battery level, error message, information by a plurality of digits, and the attached/detached state of a recording medium 200. The LCD also displays the attached/detached state of the lens unit 300, communication I/F operation, date and time, and the connection state of an external computer via a connector 96.

Some of the display contents of the notification unit 54 are indicated in the optical viewfinder 104, which include, e.g., in-focus, ready for shooting, camera shake warning, flash charge, flash charge completion, shutter speed, aperture value, exposure compensation, and recording medium write operation.

A nonvolatile memory 56 is an electrically erasable programmable memory such as an EEPROM and stores programs (to be described later) and the like.

Reference numerals 60, 62, 64, 66, 68, and 70 denote operation means for inputting various kinds of operation instructions of the system control circuit 50. They include a single component or a combination of a plurality of switches, dials, touch panel, pointing by line-of-sight detection, and voice recognition device.

The operation means will be described here in detail.

The mode dial switch 60 can selectively set a shooting mode such as an automatic shooting mode, programmed shooting mode, shutter speed priority shooting mode, aperture stop priority shooting mode, manual shooting mode, or focal depth priority (depth) shooting mode. The mode dial switch 60 can also selectively set a shooting mode such as a portrait shooting mode, landscape shooting mode, closeup shooting mode, sports shooting mode, nightscape shooting mode, and panoramic shooting mode.

The shutter switch SW1 62 is turned on by operating a shutter button (not shown) halfway (e.g., half stroke) to instruct the start of an operation such as AF processing, AE processing, AWB processing, or EF processing.

The shutter switch SW2 64 is turned on by operating the shutter button (not shown) completely (e.g., full stroke) to instruct the start of a series of shooting processes including exposure processing, development processing, and recording processing. In the exposure processing, the aperture stop 312 and shutter 12 are controlled to give a necessary exposure amount to the image sensor 14. In the development processing, a signal read out from the image sensor 14 is written in the memory 30 via the A/D converter 16 and memory control circuit 22 and then converted into a displayable image using the image processing circuit 20 or memory control circuit 22. In the recording processing, image data is read out from the memory 30, compressed by the compression/decompression circuit 32, and written in the recording medium 200.

The playback switch 66 instructs the start of a playback operation of reading out an image sensed in a shooting mode from the memory 30 or recording medium 200 and displaying it on the image display unit 28.

The single-shot/continuous shooting switch 68 can set a single-shot mode in which shooting of one frame is performed when the user presses the shutter switch SW2 (64), and then a standby state is set, or a continuous shooting mode in which shooting is continuously performed while the user is pressing the shutter switch SW2 (64).

The operation unit 70 comprises various buttons and a touch panel. Examples of the buttons are a live view start/stop button, menu button, setting button, multiwindow playback/page break button, flash setting button, and single-shot/continuous shooting/self timer switch button. The operation unit also has a menu move plus (+) button, menu move minus (−) button, playback image move plus (+) button, playback image move minus (−) button, image quality select button, exposure compensation button, brightens compensation button, external flash light emission amount setting button, and date/time setting button. The numerical values or functions of the plus and minus buttons can more easily be selected using a rotary dial switch.

The operation unit also has an image display ON/OFF switch which turns on/off the image display unit 28, and a quick review ON/OFF switch which sets a quick review function of automatically playing back sensed image data immediately after shooting. The operation unit also has a compression mode switch which selects a compression ratio for JPEG compression, or a RAW mode for directly digitizing a signal from the image sensor and recording it on a recording medium. The operation unit also has an AF mode setting switch capable of setting a one-shot AF mode or a servo AF mode. In the one-shot AF mode, the auto-focus operation starts when the user presses the shutter switch SW1 (62). Once an in-focus state is obtained, this state is continuously held. In the servo AF mode, the auto-focus operation is continuously performed while the user is pressing the shutter switch SW1 (62). The operation unit also includes a setting switch capable of setting a dust information acquisition mode to sense a dust detection image and acquire dust information, as will be described later.

A power switch 72 can selectively set the power ON or power OFF mode of the camera body 100. The power switch 72 can also selectively set the power ON or power OFF mode of each of various accessories including the lens unit 300, external electronic flash 112, and recording medium 200 connected to the camera body 100.

A power supply control unit 80 includes a cell detection circuit, DC/DC converter, and switching circuit for switching the block to be energized. The power supply control unit 80 detects the presence/absence of attachment of a cell, the type of cell, and the battery level, controls the DC/DC converter based on the detection result and an instruction from the system control circuit 50, and supplies a necessary voltage to the units including a recording medium for a necessary period.

Reference numerals 82 and 84 denote connectors; and 86, a power supply unit formed from a primary cell such as an alkaline cell or lithium cell, a secondary cell such as an NiCd cell, NiMH cell, Li-ion cell, or Li-polymer cell, or an AC adapter.

Reference numerals 90 and 94 denote interfaces to a PC or a recording medium such as a memory card or hard disk; and 92 and 96, connectors to connect a PC or a recording medium such as a memory card or hard disk. An attachment detection circuit 98 detects whether the recording medium 200 or a PC is attached or connected to the connectors 92 and/or 96.

In this embodiment, there are two systems of interfaces and connectors to connect a recording medium or PC. The interfaces and connectors to connect a recording medium or PC can have either one or a plurality of systems. Interfaces and connectors of different standards may be combined.

Interfaces and connectors based on various storage medium standards are usable. Examples are a PCMCIA (Personal Computer Memory Card International Association) card, CF (CompactFlash®) card, and SD card. When the interfaces 90 and 94 and the connectors 92 and 96 are based on the standard of the PCMCIA card or CF® card, various kinds of communication cards are connectable. Examples of the communication cards are a LAN card, modem card, USB (Universal Serial Bus) card, and IEEE (Institute of Electrical and Electronic Engineers) 1394 card. A P1284 card, SCSI (Small Computer System Interface) card, and PHS are also usable. It is possible to transfer image data and management information associated with it to another computer or a peripheral device such as a printer by connecting the various kinds of communication cards.

The optical viewfinder 104 can display an optical image formed by a light beam which enters the imaging lens 310 and is guided via the aperture stop 312, lens mounts 306 and 106, and mirrors 130 and 132 by the single-lens reflex method. It is therefore possible to perform shooting using not the electronic viewfinder function of the image display unit 28 but only the optical viewfinder. Some of the functions of the notification unit 54 such as an in-focus state, camera shake warning, flash charge, shutter speed, aperture value, and exposure compensation are displayed in the optical viewfinder 104.

The external electronic flash 112 is attached via an accessory shoe 110. An interface 120 connects the camera body 100 to the lens unit 300.

A connector 122 electrically connects the camera body 100 to the lens unit 300. A lens attachment detection unit (not shown) detects whether the lens unit 300 is attached to the lens mount 106 and connector 122. The connector 122 also has a function of transmitting control signals, state signals, and data signals between the camera body 100 and the lens unit 300 and also supplying currents of various voltages. The connector 122 may have not only the telecommunication function but also an optical communication or speech communication function.

The recording medium 200 is a memory card or hard disk. The recording medium 200 includes a recording unit 202 formed from a semiconductor memory or magnetic disk, an interface 204 to the camera body 100, and a connector 206 to connect the camera body 100.

As the recording medium 200, a memory card such as a PCMCIA card or compact flash®, or a hard disk is usable. A micro DAT, a magnetooptical disk, an optical disk such as a CD-R or CD-RW, or a phase-change optical disk such as a DVD may also be used.

Processing of eliminating the influence of dust (foreign substance) on an optical element such as an optical low-pass filter or cover glass arranged in front of the image sensor of the digital camera having the above-described arrangement will be described next.

In this embodiment, a dust detection image for obtaining dust information (foreign substance information) is sensed, dust data is extracted, and the dust information is attached to normal image data subsequently sensed. Post-processing is performed by a PC or the like, thereby removing the dust. The dust detection image is preferably obtained by sensing a surface having a uniform luminance as much as possible. However, the uniformity need not be strict because it is also possible to easily sense the image in a familiar place. For example, sensing a blue sky or white wall is assumed.

Figure 2:
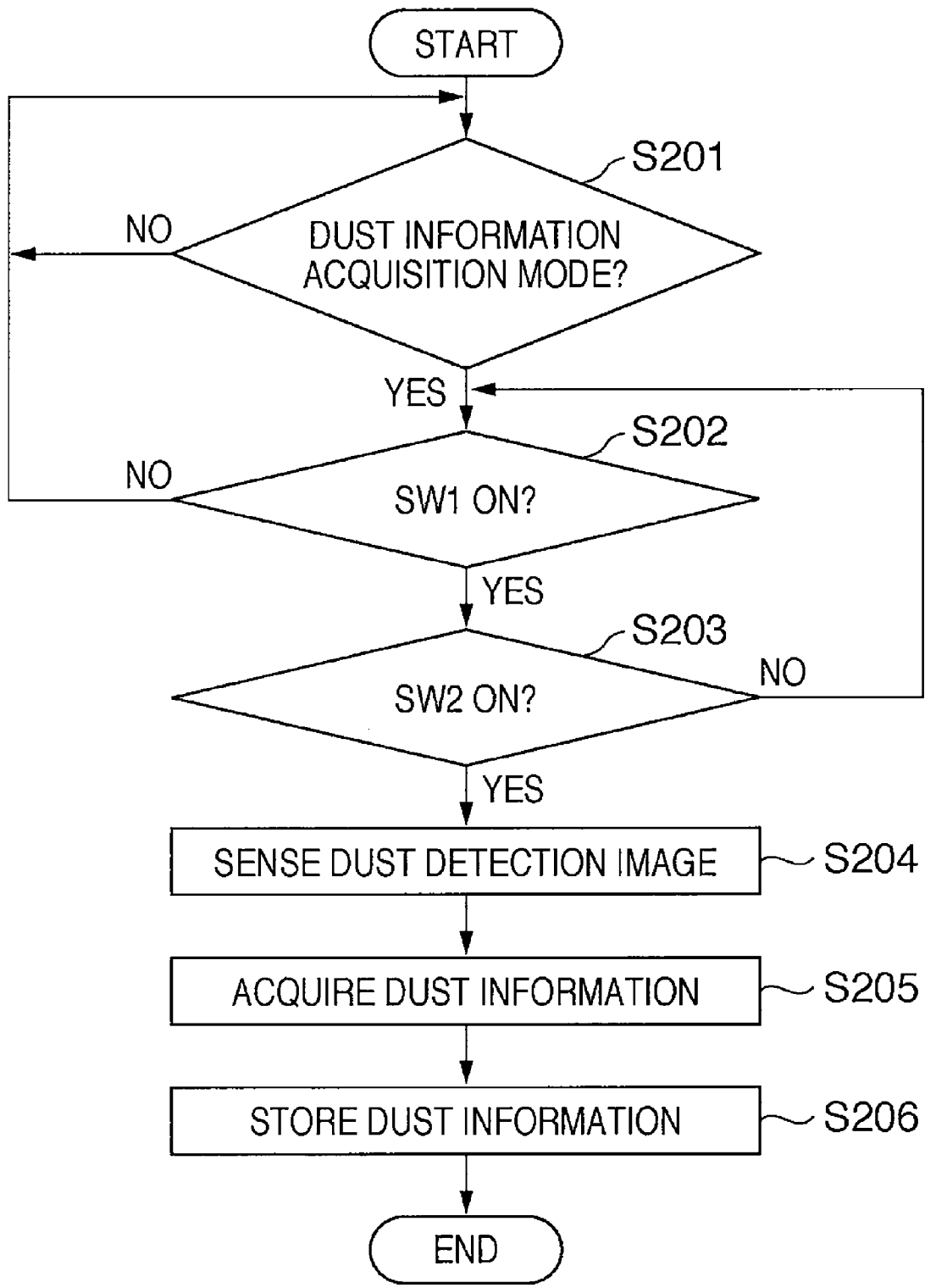
FIG. 2 is a flowchart illustrating processing when acquiring dust information.

FIG. 2 is a flowchart illustrating processing of the digital camera when acquiring dust information in this embodiment.

First, in step S201, it is determined whether the operation unit 70 selects a dust information acquisition mode. The determination in step S201 is repeated until the dust information acquisition mode is selected. When the dust information acquisition mode is selected, the process advances to step S202 to determine whether the shutter switch SW1 (62) is turned on. If the shutter switch is OFF, the process returns to step S201 to repeat the above-described processing.

If the shutter switch SW1 (62) is ON in step S202, the aperture value, ISO value, shutter speed, and other parameters associated with shooting are set.

Figures 3, 4:
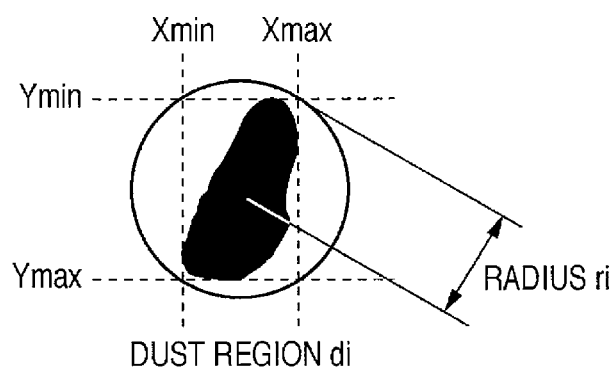
FIG. 3 is a view showing a list of setting parameters when acquiring dust information.
FIG. 4 is a view showing the outline of dust region size calculation.

FIG. 3 shows the parameters set here. The aperture value is set to, e.g., F22 in a stopped-down-aperture state. Shooting may be done using the minimum aperture within a range settable in the lens unit 300 connected to the lens mount 106. The aperture is stopped down because dust normally sticks to not the surface of the image sensor 14 but to the surface of a protective glass protecting the image sensor 14 or the surface of an optical filter placed not on the image sensor side but on the object side, and its imaging state changes depending on the aperture value of the lens unit 300. If the aperture is close to the full aperture, the image becomes blur, and it is impossible to acquire an appropriate dust detection image. For this reason, shooting is preferably done using the minimum aperture.

Referring back to the flowchart in FIG. 2, at this time, the user points the digital camera to a uniform luminance surface such as a wall as white as possible and operates the shutter switch SW2 (64).

In step S203, it is determined whether the shutter switch SW2 (64) is turned on. If the shutter switch is OFF, the process returns to step S202 to determine whether the shutter switch SW1 (62) is ON or OFF. If the shutter switch SW2 (64) is ON in step S203, the process advances to step S204. In step S204, the dust detection image (uniform luminance surface) is sensed, and the image data is stored in the memory 30. In step S205, dust information is acquired from the image data stored in the memory 30.

The dust information acquisition method will be described. More specifically, the position (coordinates) and size of each dust region are obtained from the sensed dust detection image. First, the region of the sensed dust detection image is divided into a plurality of blocks. A maximum luminance Lmax and an average luminance Lave in each block are calculated. A threshold value T1 in each block is calculated by $$T1 = Lave \times 0.6 + Lmax \times 0.4$$

Next, each pixel less than the threshold value T1 is determined to be a dust pixel. Each isolated region formed from dust pixels is defined as a dust region di (i=0, 1, . . . , n).

FIG. 4 is a view showing the outline of dust region size calculation. As shown in FIG. 4, a maximum value Xmax and a minimum value Xmin of the horizontal coordinates and a maximum value Ymax and a minimum value Ymin of the vertical coordinates of pixels included in a dust region are obtained. A radius ri representing the size of the dust region di is calculated by $$ri = [\sqrt{\{(Xmax-Xmin)^2 + (Ymax-Ymin)^2\}}]/2$$

Central coordinates (Xdi,Ydi) are obtained approximately by $$Xdi = (Xmax + Xmin)/2$$

$$Ydi = (Ymax + Ymin)/2$$

The thus obtained position (coordinates) and radius are recorded in the nonvolatile memory 56 as dust information, as will be described later.

Dust information has a structure shown in FIG. 5. As shown in FIG. 5, dust information stores the lens information and the information of the position and size of each dust particle upon shooting a dust detection image. More specifically, the actual aperture value (f-number) and the lens pupil position upon shooting a dust detection image are stored as the lens information upon shooting the dust detection image. Next, the number of detected dust regions (integer value) is stored in the storage area. Next to this value, the specific parameters of each dust region are stored repeatedly as many as the dust regions. The parameters of a dust region include a set of three numerical values: the radius of dust (e.g., 2 bytes), the x-coordinate of the center of an effective image area (e.g., 2 bytes), and the y-coordinate of the center (e.g., 2 bytes).

In this embodiment, dust information obtained in the above-described way is recorded in the nonvolatile memory 56 in the digital camera, as will be described later, and also added to the data of each normally sensed image which is sensed after shooting of the dust detection image and should be recorded in the recording medium 200. More specifically, the dust information is added to, e.g., an Exif region which is the header field of an image file where camera set values upon shooting are recorded. Alternatively, the dust information is recorded as an independent file, and only link information to the dust information file is recorded in image data, thereby associating the dust information and image data. However, if the image file and the dust information file are separately recorded, the link relationship may be lost upon moving the image file. To prevent this, the dust information is preferably held together with the image data.

Adding dust information to normally sensed image data enables to move the normally sensed image data to an external image processing apparatus and cause it to correct the normally sensed image data influenced by dust. Dust correction processing by the external image processing apparatus is not directly relevant to the gist of the present invention, and a description thereof will be omitted.

Referring back to the flowchart in FIG. 2, the dust information acquired in step S205 is stored in the nonvolatile memory 56 in step S206, and the processing of acquiring dust information is ended. The dust information is stored in the nonvolatile memory 56 to continuously add the dust information to image data obtained by normal shooting (final shooting) that should be executed until the next dust information acquisition. In an arrangement for requiring the user to acquire dust information every time the camera is powered on, the memory need not be a nonvolatile memory.

The shooting operation in the dust information acquisition mode aims at acquiring dust information. Hence, the sensed image itself is neither compressed nor recorded in the recording medium 200 in this embodiment. This prevents the unnecessary image data for the user from wasting the capacity of the recording medium 200. However, the sensed image may be compressed and stored in the recording medium 200, like a normal image. Some processing of, e.g., changing the extension may be done at this time.

Figure 6:
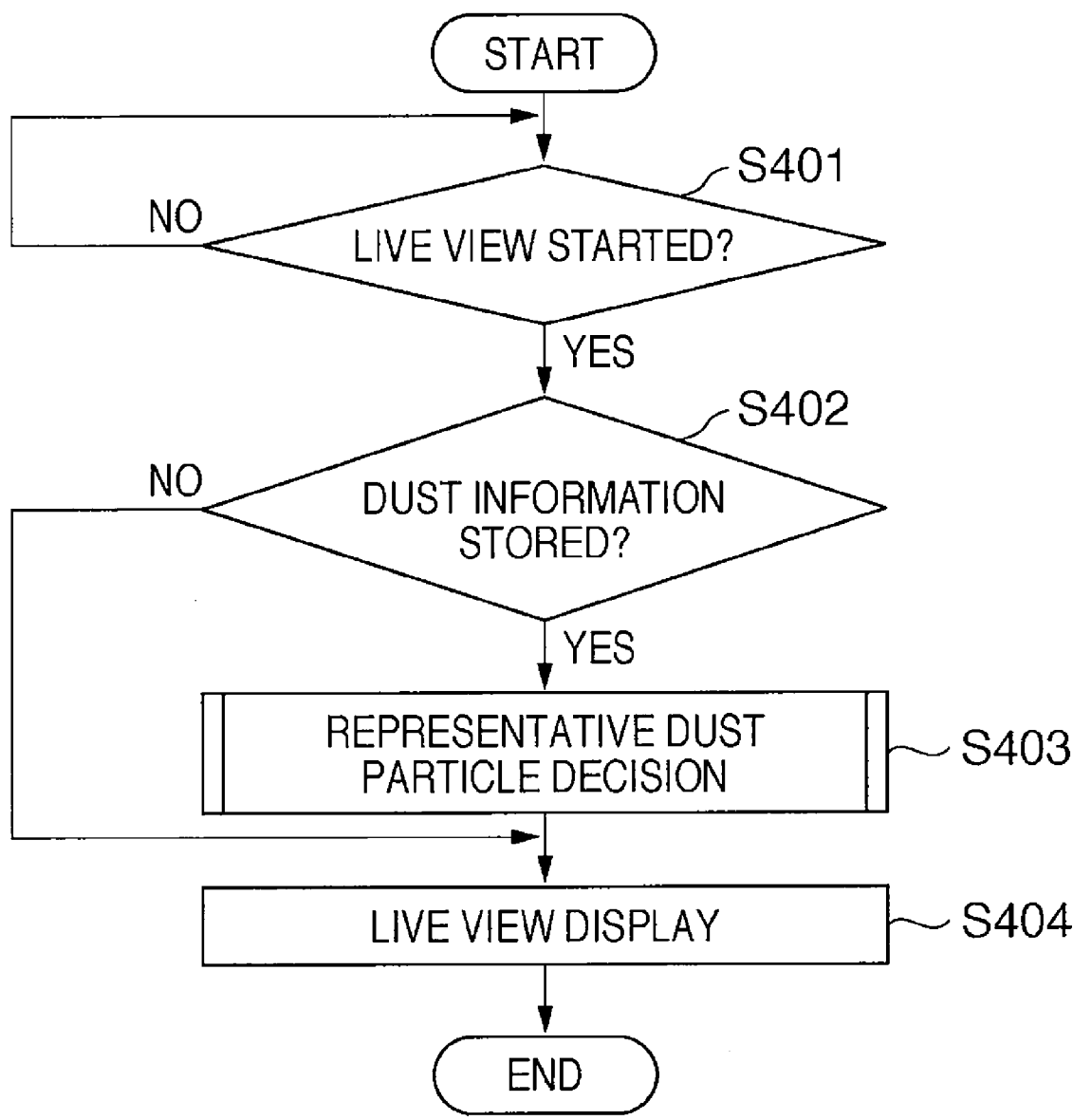
FIG. 6 is a flowchart illustrating live view display processing.

FIG. 6 is a flowchart illustrating processing of the digital camera in live view display. In this embodiment, an image representing the presence of dust is superimposed on live view display based on the dust information acquired in the above-described manner, thereby notifying the user of the dust sticking state to, e.g., the optical filter arranged in front of the image sensor. The image representing the presence of dust superimposed on live view display is neither the dust image itself captured by the image sensor 14 nor an image obtained by processing the dust image. Instead, a circle representing a dust region is generated by computer graphics based on the dust information (especially the position and size information) stored in the nonvolatile memory 56. The circle is enlarged to a size larger than the actual dust region and displayed. This allows the user to easily grasp the dust sticking state.

In step S401, it is determined whether a live view display start button of the operation unit 70 is turned on. The determination in step S401 is repeated until the live view display button is turned on. When the live view display button is turned on, the process advances to step S402. In step S402, it is determined whether dust information acquired in advance is stored in the nonvolatile memory 56. If NO in step S402, the process advances to step S404 to perform the live view display operation. If dust information exists, the process advances to step S403 to decide a "representative dust particle" to be superimposed on the live view display.

The "representative dust particle" will be described below.

Even when an image representing the presence of dust is superimposed on live view display, the user cannot visually recognize it unless, e.g., a circle representing the presence of dust is generated by computer graphics based on dust information and displayed in a larger size. Since it is therefore difficult to display all of a plurality of dust particles sticking to the surface of, e.g., the optical filter arranged in front of the image sensor 14, a noticeable dust particle is selected as a representative dust particle. Only a graphic image such as a circle generated in correspondence with the representative dust particle is superimposed on the live view display. This enables the user to easily recognize the sticking state of the noticeable dust.

Note that the dust information can be stored in any memory in the camera other than the nonvolatile memory 56.

Figure 7:
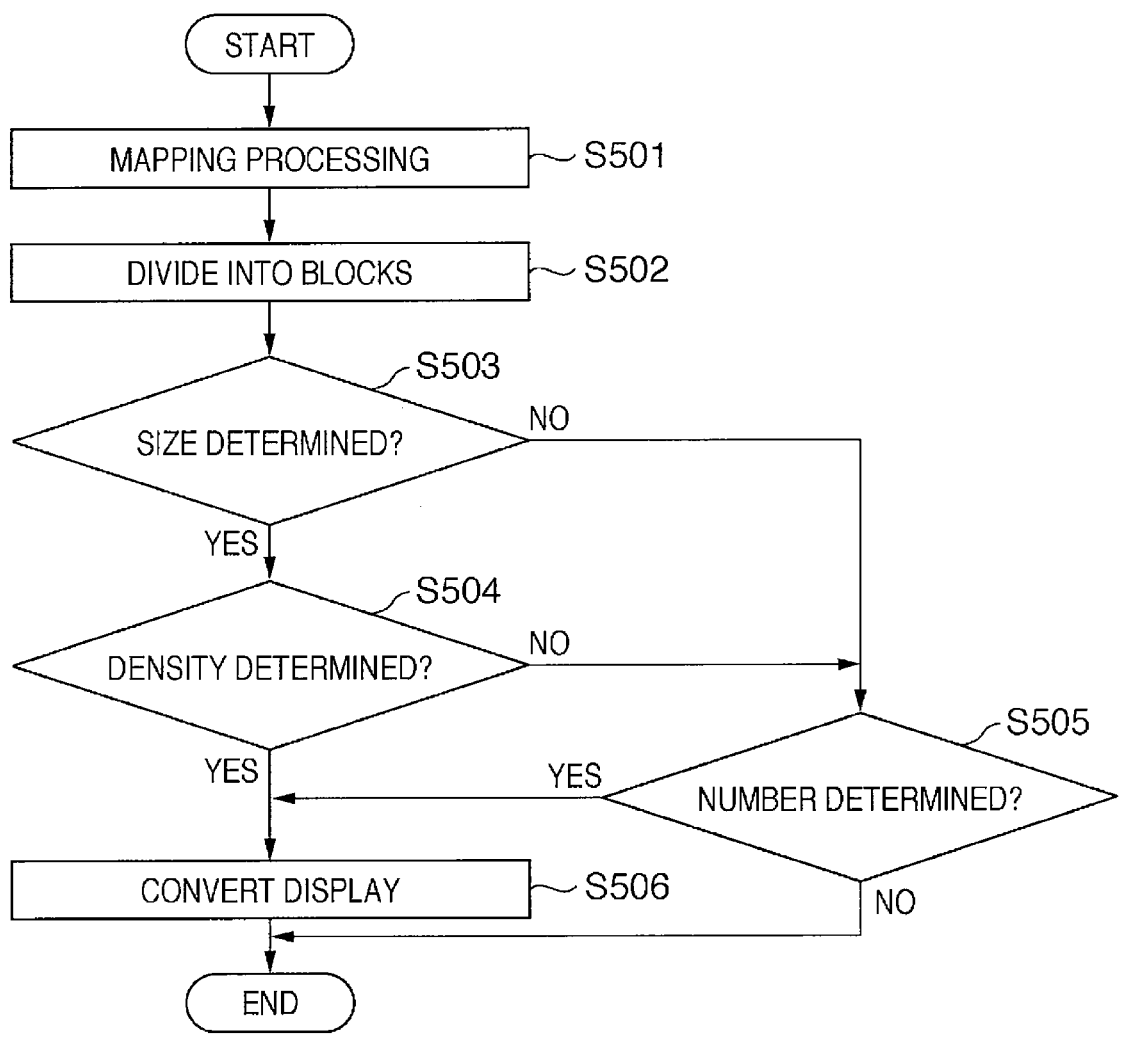
FIG. 7 is a flowchart illustrating processing of deciding a representative dust particle.

In step S403, a "representative dust particle" to be superimposed on the live view display is decided in the above-described way based on the dust information. FIG. 7 is a flowchart illustrating processing of deciding a "representative dust particle". The "representative dust particle" decision processing will be described with reference to FIG. 7.

In step S501, the position and density of each dust particle are specified based on the dust information stored in the nonvolatile memory 56, and the dust particles are mapped in a window. In this process, the position and density of each dust particle in normal shooting are calculated based on the optical information (e.g., pupil position information and aperture value information) of the lens upon shooting the dust detection image, which is contained in the dust information, and the optical information (e.g., pupil position information and aperture value information) of the currently attached lens. The dust density is calculated based on the aperture value set for final shooting.

More specifically, a coordinate sequence Di (i=1, 2, . . . , n), a dust radius sequence Ri (i=1, 2, . . . , n), aperture value f1, and lens pupil position L1 are obtained from dust correction data. An aperture value f2 and lens pupil position L2 set for final shooting are acquired, and Di is converted by the following equation. Converted coordinates Di' and converted radius Ri' are defined by $$Di'(x,y)=(L2\times(L1-H)\times d/((L2-H)\times L1))\times Di(x,y)$$

$$Ri'=(Ri\times f1/f2+3)$$

where d is the distance from the image center to the coordinates Di, and H is the distance from the surface of the image sensor 14 to the dust particle.

The unit is "pixel", and "+3" of Ri' is the margin amount. This conversion allows to obtain the position and size of a dust particle (image) on the currently attached lens.

The density of dust changes depending on the aperture value. If the aperture value is close to the full-aperture state (small f-number), the density is low. If the aperture value is close to the stopped-down-aperture state (large f-number), the density is high. When a density corresponding to a complete fill pattern is multiplied by f2/f1 to obtain a semitransparent pattern, pseudo display can be done.

Figure 8:
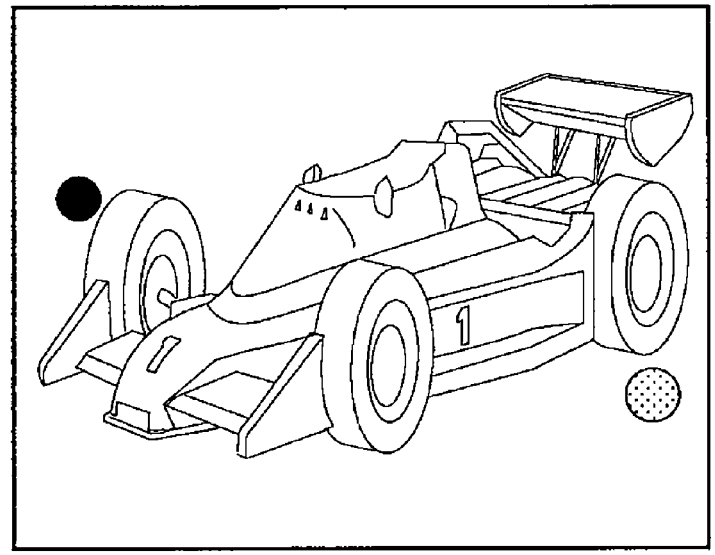
FIG. 8 is a view showing a state in which dust particles are mapped in a window in accordance with dust information.

FIG. 8 is a view showing a state in which dust particles are mapped in a window. FIG. 8 shows only large dust particles for the illustrative convenience. However, at the time of mapping, all dust particles sticking to the optical filter or the like are mapped.

Figure 9:
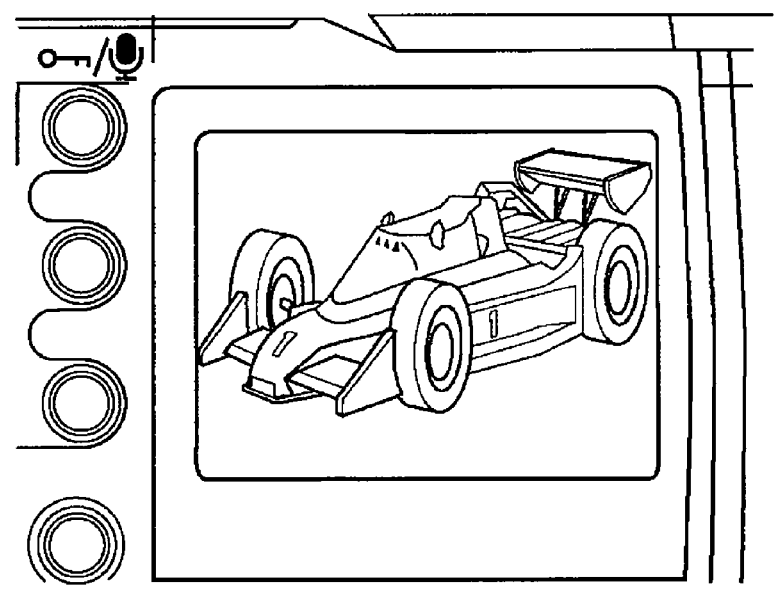
FIG. 9 is a view showing live view display without applying dust information display.

FIG. 9 is a view showing an example of live view display. Generally, image data output from the image sensor 14 is reduced and displayed in live view. Hence, a dust particle which sticks to the image sensor 14 and actually forms an image disappears from the image data upon reduction processing and cannot be confirmed in live view display. At the time of live view display, the object image is sensed while opening the aperture stop of the lens, and a dust particle is rarely sensed as an actual value.

Figure 10:
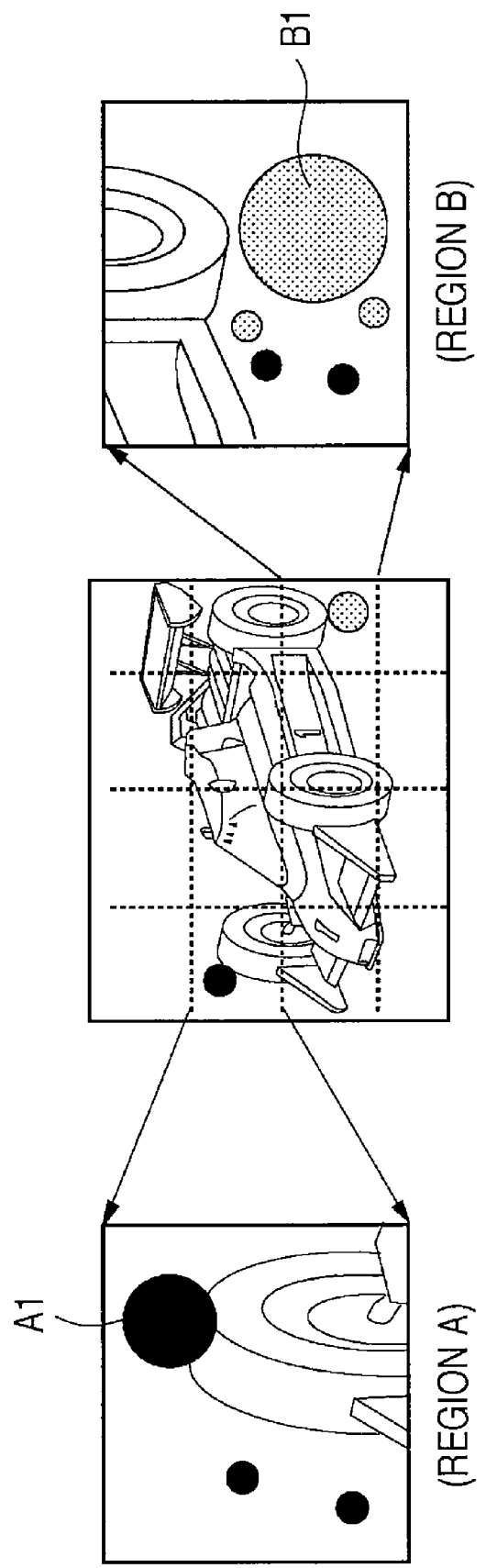
FIG. 10 is a view showing representative dust particle decision.

In step S502, the window in which the dust particles are mapped is divided into a plurality of block regions to progress the "representative dust particle" decision processing. The block size is not particularly limited. In this embodiment, the window is divided into, e.g., 4×4 blocks, as shown in FIG. 10. In the "representative dust particle" decision processing, the number of images (more specifically, circles) which represent the presence of dust particles and are to be superimposed on the live view window, and the size and density of each image are decided in consideration of the number of dust particles included in each block and the size and density of each dust particle.

Three dust particles are mapped in a region A, and five dust particles are mapped in a region B. In this embodiment, "representative dust particle" determination is done based on the size of dust, density of dust, and the number of dust particles in this order.

In step S503, it is determined whether a dust particle whose radius is larger than a preset dust radius threshold value is mapped in a block. In the region A, a dust particle A1 is determined to have a radius larger than the threshold value, and so is a dust particle B1 in the region B. If a dust particle having a radius larger than the threshold value exists, the process advances to step S504 to determine the density. If no dust particle has a radius larger than the threshold value, the process advances to step S505 to determine the number of dust particles.

In step S504, it is determined whether a dust particle whose density is more than a preset dust density threshold value is mapped in a block. In the region A, the dust particle A1 is determined to have a density more than the threshold value and therefore set as a "representative dust particle", and the process advances to step S506. The dust particle B1 in the region B has a density less than the threshold value and is therefore not set as a "representative dust particle". The process advances to step S505 to determine the number of dust particles.

In step S505, the number of dust particles is determined in each block which contains no dust particle with a size and density more than the threshold values. If the number of dust particles is larger than a preset dust particle count threshold value, the region containing the dust particles is set as a "representative dust particle", and the process advances to step S506. If the number of dust particles contained in a block is smaller than the threshold value, the process is ended. The region B contains five dust particles, and it is therefore determined that the region contains dust particles more than the threshold value. These dust particles are set as a "representative dust particle", and the process advances to step S506.

In step S506, dust data (image data representing the presence of dust) to be superimposed on live view display is generated. The dust data to be displayed need not be aware of the actual dust shape. It is only necessary to notify the user to the block where dust is present. Hence, the dust image data is enhanced by appropriately increasing the size and density. If a region containing a plurality of dust particles is set as a "representative dust particle" in step S505, the display dust data may be generated by expressing the region containing the plurality of dust particles as a circle. Alternatively, the actual shape containing the plurality of dust particles may be used as the shape of the display dust data.

Figure 11:
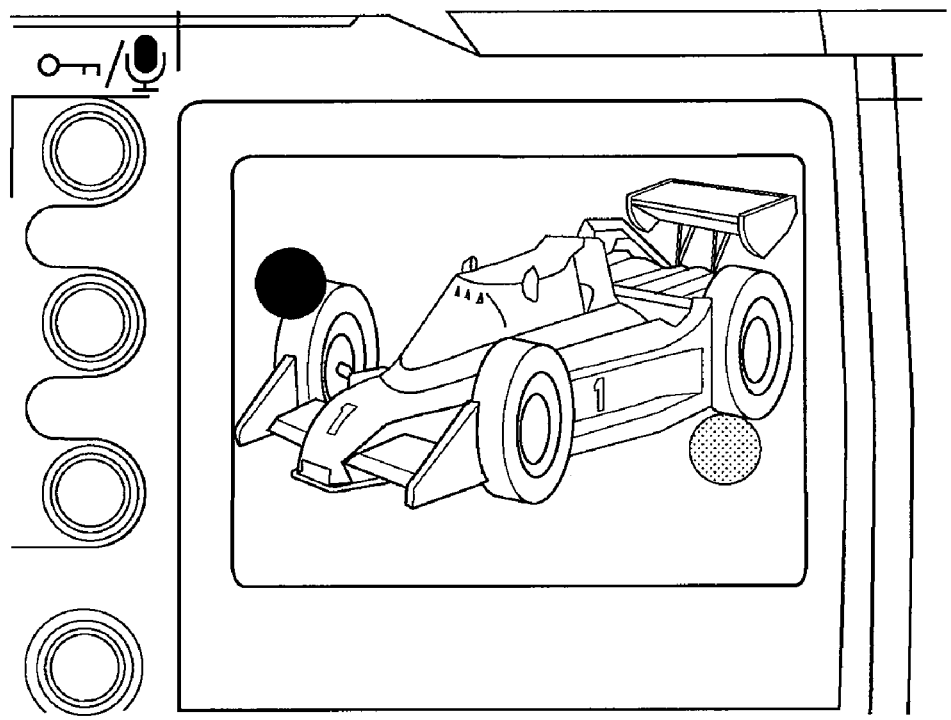
FIG. 11 is a view showing live view display which displays superimposed representative dust particles while applying dust information.

When the "representative dust particles" are decided, and preparation to superimpose the images representing the "representative dust particles" on live view is completed, in step S404 of FIG. 6, live view display starts by superimposing the images representing the "representative dust particles" on an image, as shown in FIG. 11.

As described above, according to this embodiment, the place where dust is present is obtained from dust information. The window is divided into a plurality of blocks. A "representative dust particle" is decided based the number of dust particles and the size and density of each dust particle contained in each block. An image representing a dust particle is generated by computer graphics based on the information of the position and size of the "representative dust particle", enlarged, and superimposed on live view. This allows the user to easily know the position of dust in a sensed image before shooting. If the position of dust is known, it is possible to prevent the main object from containing a dust image.

Second Embodiment

In the first embodiment, the window is divided into blocks, and processing is executed in each block. In the second embodiment, a method of notifying a user of a dust position using a focus measuring point selection frame of live view will be described. A digital camera according to the second embodiment has the same arrangement as in the first embodiment, and a description thereof will not be repeated. Only operations different from the first embodiment will be described.

Figure 12:
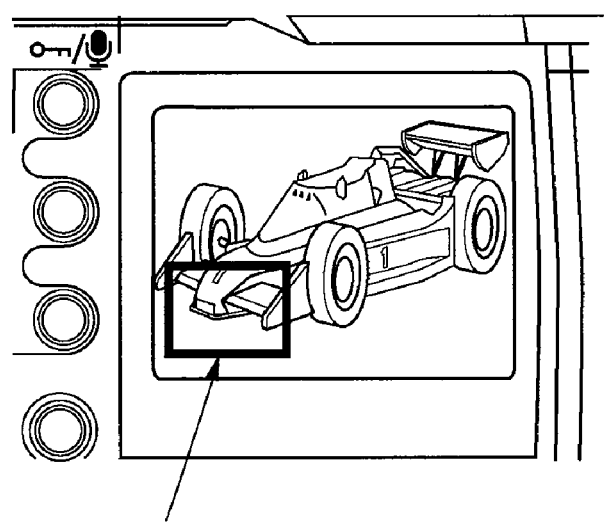
FIG. 12 is a view showing live view display without applying dust information display.

FIG. 12 is a view showing an example of a live view display window. The rectangle in the display window is a focus measuring frame for designating a desired focus point. The user can freely move (select the position of) the focus measuring frame in the window by operating a focus measuring frame moving button included in an operation unit 70.

Figure 13:
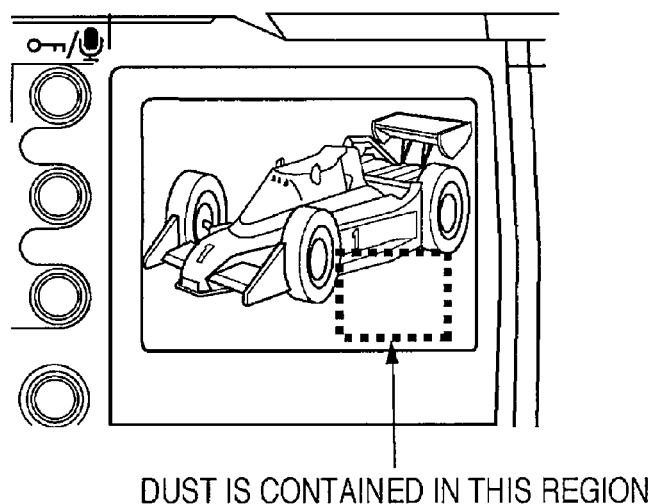
FIG. 13 is a view showing live view display which displays a dust position using a focus measuring frame while applying dust information.

As in the first embodiment, assume that it is determined based on dust information stored in a nonvolatile memory 56 that dust particles are present at positions shown in FIG. 8. FIG. 13 shows a state in which the focus measuring frame has been moved from the position shown in FIG. 12 by operating the focus measuring frame moving button. If the focus measuring frame overlaps a dust position obtained from the dust information, the focus measuring frame display method (display state) is changed to notify the user of the place where dust exists.

The focus measuring frame display method can be changed by using a dotted line, as shown in FIG. 13, changing the color, or flickering the frame. Any other method is usable if it can notify the user.

Whether to change the focus measuring frame display may be determined based on the number of dust particles in the frame and the size or density of each dust particle or by any other method.

Figure 14:
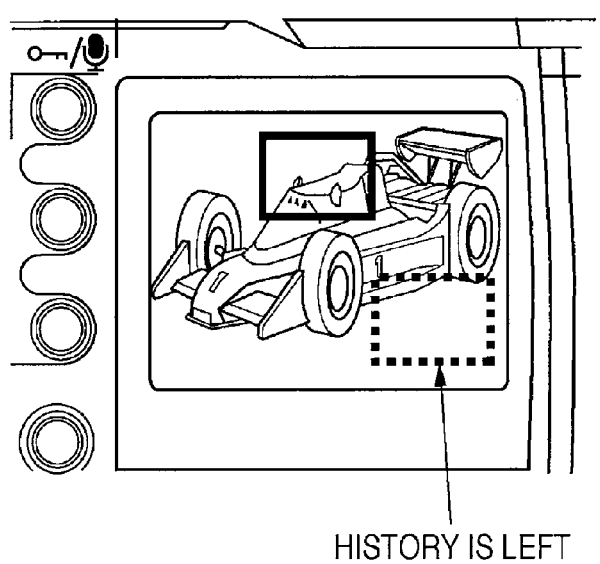
FIG. 14 is a view showing live view display which displays a dust position history using a focus measuring frame while applying dust information.

FIG. 14 is a view showing a state in which the focus measuring frame has further been moved from the position in FIG. 13 by operating the focus measuring frame moving button. For a region that is once determined as a dust region, a history remains even after the focus measuring frame is moved. This allows to continuously notify the user of the dust position. Either one history or a plurality of histories can be left. The history may be erased at the end of live view or by causing a timer or the like to measure a predetermined time.

As described above, according to this embodiment, the user can easily know the place where dust is present in an image only by moving the focus measuring frame. Even after the focus measuring frame is moved, the user can continuously know the region containing dust. It is therefore possible to prevent a dust image from being formed at the focus position.

Third Embodiment

Figure 15:
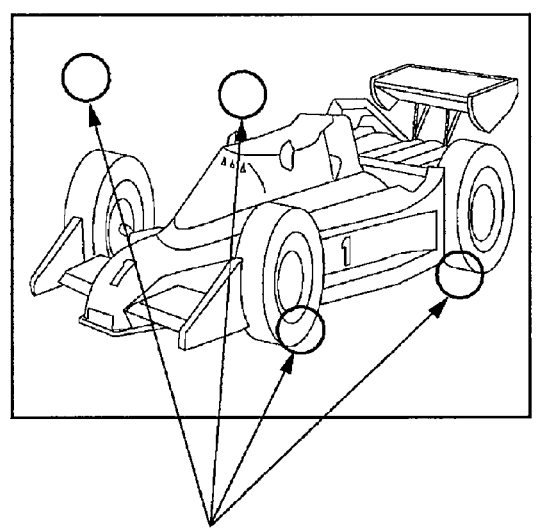
FIG. 15 is a view showing positions where dust particles stick.

In this embodiment, a method of notifying a user of the presence/absence of dust by automatically enlarging the dust position at the start of live view using dust information will be described. A digital camera according to the third embodiment has the same arrangement as in the first embodiment, and a description thereof will not be repeated. Only operations different from the first embodiment will be described. In this embodiment, dust information represents that dust particles stick at positions indicated by circles in FIG. 15.

As described above, generally, image data output from an image sensor 14 is reduced and displayed in live-view, as shown in FIG. 9. Hence, a dust particle which sticks to an optical element arranged in front of the image sensor 14 and actually forms an image disappears from the image data upon reduction processing and cannot be confirmed in live view display.

Figure 16:
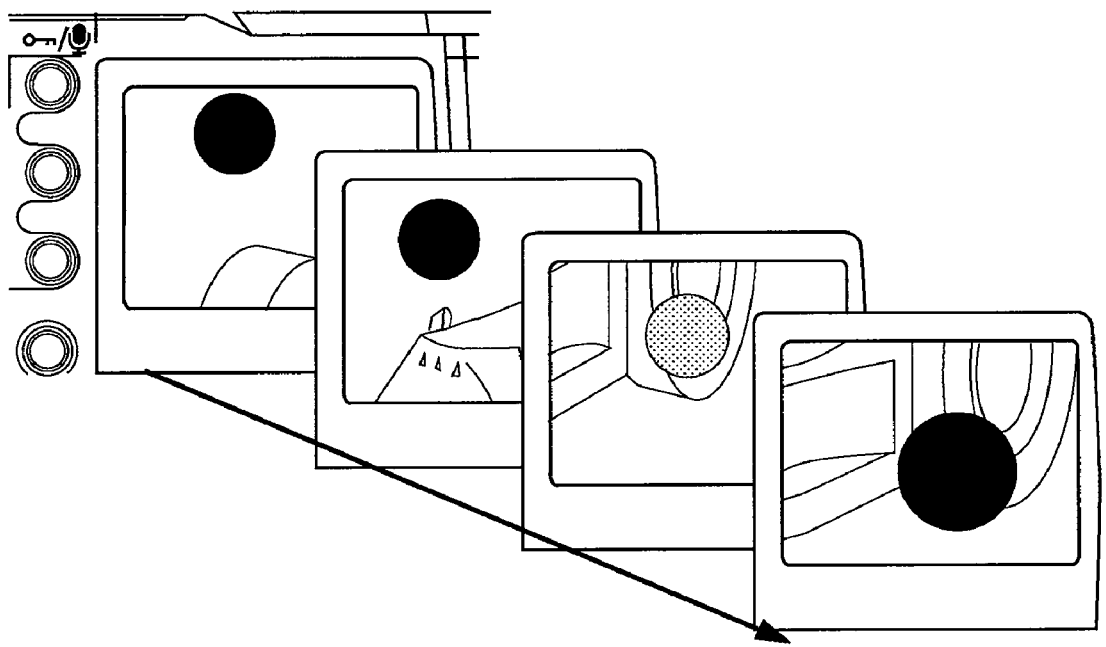
FIG. 16 is a view showing live view display which sequentially enlarges a dust sticking region while applying dust information.

To prevent this, when the user starts live view, each dust position is obtained from dust information stored in a nonvolatile memory 56, and a region where a dust particle sticks is sequentially enlarged and displayed. FIG. 16 is a view showing the live view display.

In the third embodiment as well, the image representing the presence of dust superimposed on live view display is neither the dust image itself captured by the image sensor 14 nor an image obtained by processing the dust image. Instead, a circle representing a dust region is generated by computer graphics based on the dust information (especially the position and size information) stored in the nonvolatile memory 56. The circle is enlarged to a size larger than the actual dust region and displayed.

The region where dust sticks is sequentially enlarged and displayed in the above-described way either at the start of live view or at an arbitrary timing set by a user operation. Switching to the enlarged image display can be done either automatically at a predetermined time or by a user operation.

Figure 17:
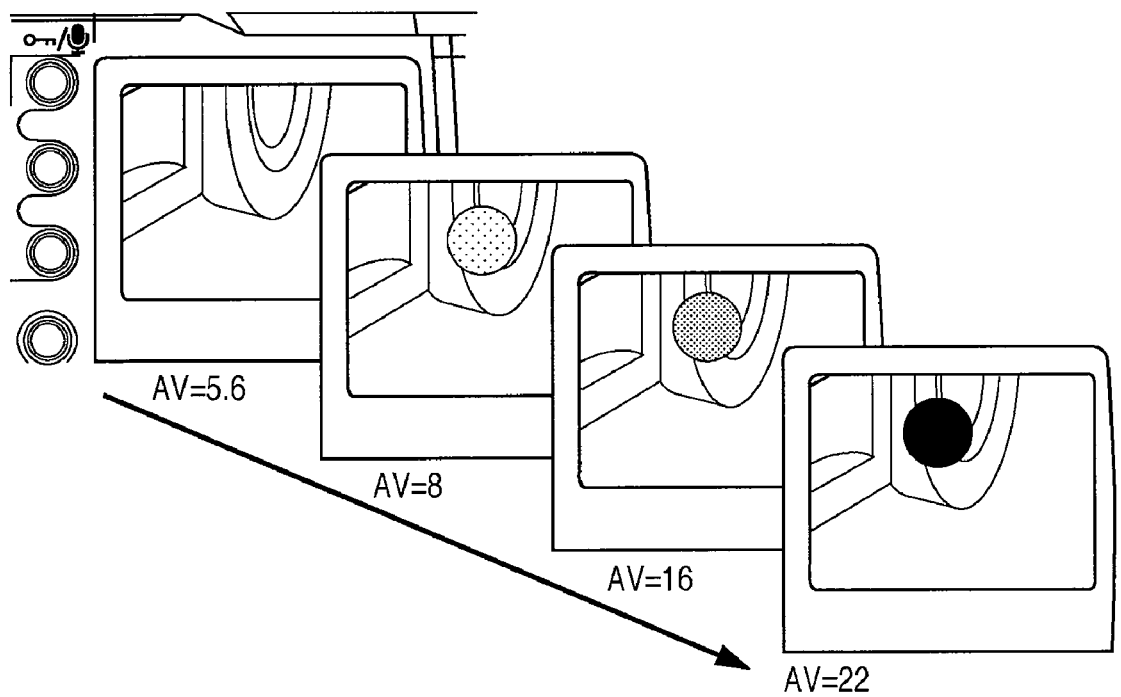
FIG. 17 is a view showing live view display which changes the aperture value during enlarged display of a dust sticking region while applying dust information.

The density of dust changes depending on the optical condition of the lens used at that time. For example, when a region where a dust particle sticks is enlarged, it is possible to perform control to confirm the degree of conspicuousness of dust at each aperture value by pseudo-changing the aperture value. FIG. 17 is a view showing live view display at this time, in which the user can confirm that the dust image becomes remarkable as the aperture stop is stopped down. That is, it is possible to confirm the degree of influence of dust on the image in the stopped-down-aperture state by computer graphics without actually stopping down the aperture stop of the lens.

Even in the example shown in FIG. 17, dust (a circle representing the presence of dust) superimposed on live view display is indicated by an image generated by computer graphics based on the position of the position and size of a dust particle stored in the nonvolatile memory 56. A change in the density of the circle representing the presence of dust with respect to the aperture value is expressed by multiplying a complete fill pattern by f2/f1 to obtain a semitransparent pattern, as described in the first embodiment. The vales f1 and f2 can be obtained from information stored in the nonvolatile memory 56.

As described above, according to this embodiment, a region registered in dust information is automatically enlarged and displayed at the start of live view. This allows the user to easily confirm the presence/absence of dust before shooting. Additionally, the user can know the aperture value at which the dust image becomes noticeable by changing the aperture value upon enlargement.

Other Embodiments

The objects of the embodiments are also achieved by the following method. A storage medium (or recording medium) which records software program codes to implement the functions of the above-described embodiments is supplied to a system or apparatus. The computer (or CPU or MPU) of the system or apparatus reads out and executes the program codes stored in the storage medium. In this case, the program codes read out from the storage medium themselves implement the functions of the above-described embodiments. The storage medium that stores the program codes constitutes the present invention. The functions of the above-described embodiments are implemented not only by causing the computer to execute the readout program codes. The present invention also incorporates the following arrangement. The operating system (OS) running on the computer partially or wholly executes actual processing on the basis of the instructions of the program codes, thereby implementing the functions of the above-described embodiments.

The present invention also incorporates the following arrangement. The program codes read out from the storage medium are written in the memory of a function expansion card inserted to the computer or a function expansion unit connected to the computer. The CPU of the function expansion card or function expansion unit partially or wholly executes actual processing on the basis of the instructions of the program codes, thereby implementing the functions of the above-described embodiments.

The storage medium to which the present invention is applied stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-237262, filed Sep. 12, 2007, which is hereby incorporated by reference herein in its entirety.

What is claimed is:

1. An image capturing apparatus comprising:
an image capturing unit which causes an image sensor to photoelectrically convert an object image to generate an image signal;
a display unit which displays the image signal generated by said image capturing unit;
a storage unit which stores foreign substance information that is information about at least a position and size of a foreign substance sticking to a surface of an optical element arranged in front of the image sensor; and
a control unit which controls said display unit to display the image signal while superimposing, on the image signal, an image which represents presence of the foreign substance and is generated based on the foreign substance information stored in said storage unit during a live view operation of sequentially displaying, on said display unit, image signals sequentially generated by said image capturing unit.

2. The apparatus according to claim 1, wherein the image representing the presence of the foreign substance is generated as a graphic based on the foreign substance information.

3. The apparatus according to claim 2, wherein the image representing the presence of the foreign substance is a circle whose size is changed based on at least one of the number of foreign substances and a size of each foreign substance contained in each of regions formed by dividing a screen of the image sensor into a plurality of regions.

4. The apparatus according to claim 2, wherein the image representing the presence of the foreign substance is a focus measuring frame representing a region where an in-focus state is obtained in a screen of the image sensor, a display method of the focus measuring frame being changed based on at least one of the number of foreign substances and a size of each foreign substance contained in a region near the focus measuring frame.

5. The apparatus according to claim 4, wherein changing the display method includes changing a color of the focus measuring frame.

6. The apparatus according to claim 2, wherein the image representing the presence of the foreign substance changes a density in accordance with an aperture value of a lens attached to the image capturing apparatus upon shooting by the image capturing apparatus.

7. The apparatus according to claim 2, wherein the image representing the presence of the foreign substance is displayed when dividing a screen of the image sensor into a plurality of regions and enlarging and displaying each of the divided regions.

8. The apparatus according to claim 2, wherein the image representing the presence of the foreign substance is displayed to express influence of a change in an aperture value in accordance with a plurality of aperture values of a lens attached to the image capturing apparatus upon shooting by the image capturing apparatus.

9. A method of controlling an image capturing apparatus including an image capturing unit which causes an image sensor to photoelectrically convert an object image to generate an image signal, and a display unit which displays the image signal generated by the image capturing unit, comprising the steps of:
storing, in a storage unit, foreign substance information that is information about at least a position and size of a foreign substance sticking to a surface of an optical element arranged in front of the image sensor; and
controlling the display unit to display the image signal while superimposing, on the image signal, an image which represents presence of the foreign substance and is generated based on the foreign substance information stored in the storage unit during a live view operation of sequentially displaying, on the display unit, image signals sequentially generated by the image capturing unit.

10. A program, recorded/stored in a non-transitory computer-readable medium, which causes a computer to execute a control method of claim 9.

* * * * *